United States Patent [19]

Young et al.

[11] Patent Number: 4,498,554
[45] Date of Patent: Feb. 12, 1985

[54] HIGHLY MANEUVERABLE PRIME MOVER

[76] Inventors: Roy E. Young, Clemson University, Agricultural Engineering Dept., Clemson, S.C. 29631; Douglas K. Stricklin, 170 Lilac Ln., Brea, Calif. 92621; Henry M. W. Givens, 3818 So. K St., Tacoma, Wash. 98405

[21] Appl. No.: 374,226

[22] Filed: May 3, 1982

[51] Int. Cl.$^3$ .............................................. B62D 5/00
[52] U.S. Cl. .................................. 180/236; 180/140; 414/526
[58] Field of Search ............... 180/140, 236; 414/338, 414/503, 505, 527, 528, 489, 526, 629, 633, 739; 212/245

[56] References Cited

U.S. PATENT DOCUMENTS

| | | | |
|---|---|---|---|
| 1,577,559 | 3/1926 | Budd . | |
| 1,901,276 | 3/1933 | Adams . | |
| 2,752,056 | 6/1956 | Lull | 414/629 |
| 2,863,518 | 12/1958 | Pellizzetti . | |
| 3,087,564 | 4/1963 | Quayle | 180/140 |
| 3,197,229 | 7/1965 | Houlton . | |
| 3,255,840 | 6/1966 | Tangen | 180/236 |
| 3,288,313 | 11/1966 | Hamilton | 414/739 |
| 3,306,390 | 2/1967 | Jamme . | |
| 3,490,555 | 1/1970 | Noack | 180/140 |
| 3,490,606 | 1/1970 | Gordon | 212/245 |
| 3,495,846 | 2/1970 | Tax | 280/91 |
| 3,572,458 | 3/1971 | Tax | 180/79.1 |
| 3,703,972 | 11/1972 | Muldoon | 414/526 |
| 3,724,585 | 4/1973 | Conrad | 180/79.2 C |
| 3,747,789 | 7/1973 | Shipley et al. | 414/633 |
| 3,825,087 | 7/1974 | Wilson | 180/6.48 |
| 3,856,102 | 12/1974 | Queen | 180/236 |
| 3,944,098 | 3/1976 | Foote | 414/526 |
| 3,957,161 | 5/1976 | Tax | 212/245 |
| 3,972,379 | 8/1976 | Norris | 180/46 |
| 3,981,336 | 9/1976 | Levesque | 144/3 D |
| 4,072,242 | 2/1978 | Cook | 414/528 |
| 4,081,094 | 3/1978 | Pereira et al. | 414/528 |

FOREIGN PATENT DOCUMENTS 1010373  5/1977  Canada .

Primary Examiner—Lawrence J. Oresky
Attorney, Agent, or Firm—Keith D. Gehr

[57] ABSTRACT

The invention is a highly maneuverable prime mover adapted for normal or orthogonal steering modes. In the normal mode true Ackermann steering is achieved. Either two or four wheel steering may be chosen. When in the orthogonal mode the vehicle is hybrid skid steered. In hybrid steering only one wheel of a side-by-side pair is steered. This greatly simplifies the necessary shifting mechanisms. Each wheel is driven by an individual hydraulic motor supplied from a main system. In the preferred version the prime mover has a turret capable of 360° rotation. This turret preferably has a universal mounting capable of holding various types of lifting tools. The prime mover is especially well adapted for use with a tool head comprising an array of parallel screws or chains which can rapidly pick up, transport, and deposit objects such as container grown nursery plants.

35 Claims, 8 Drawing Figures

ACKERMANN STEER MODE

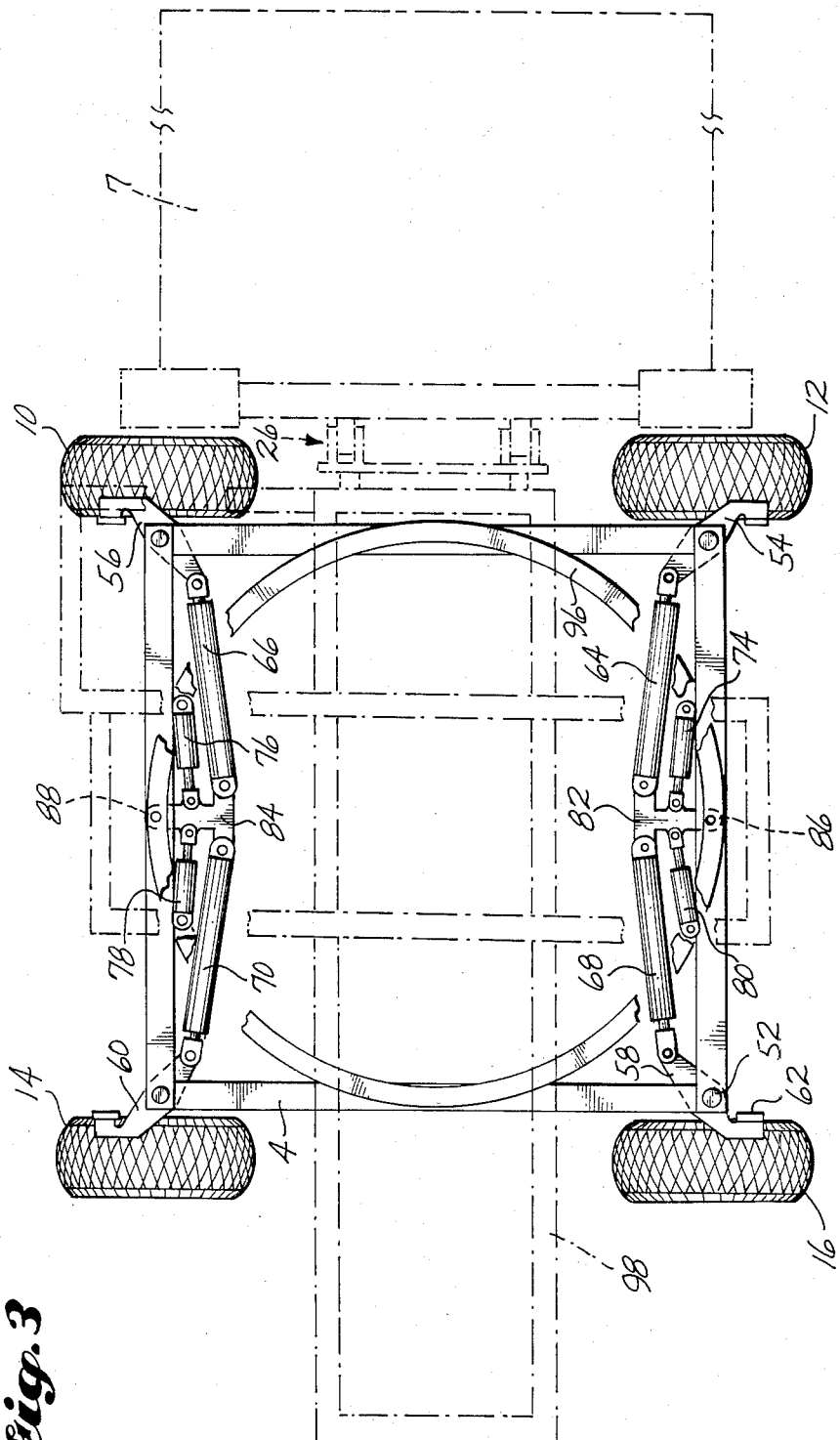

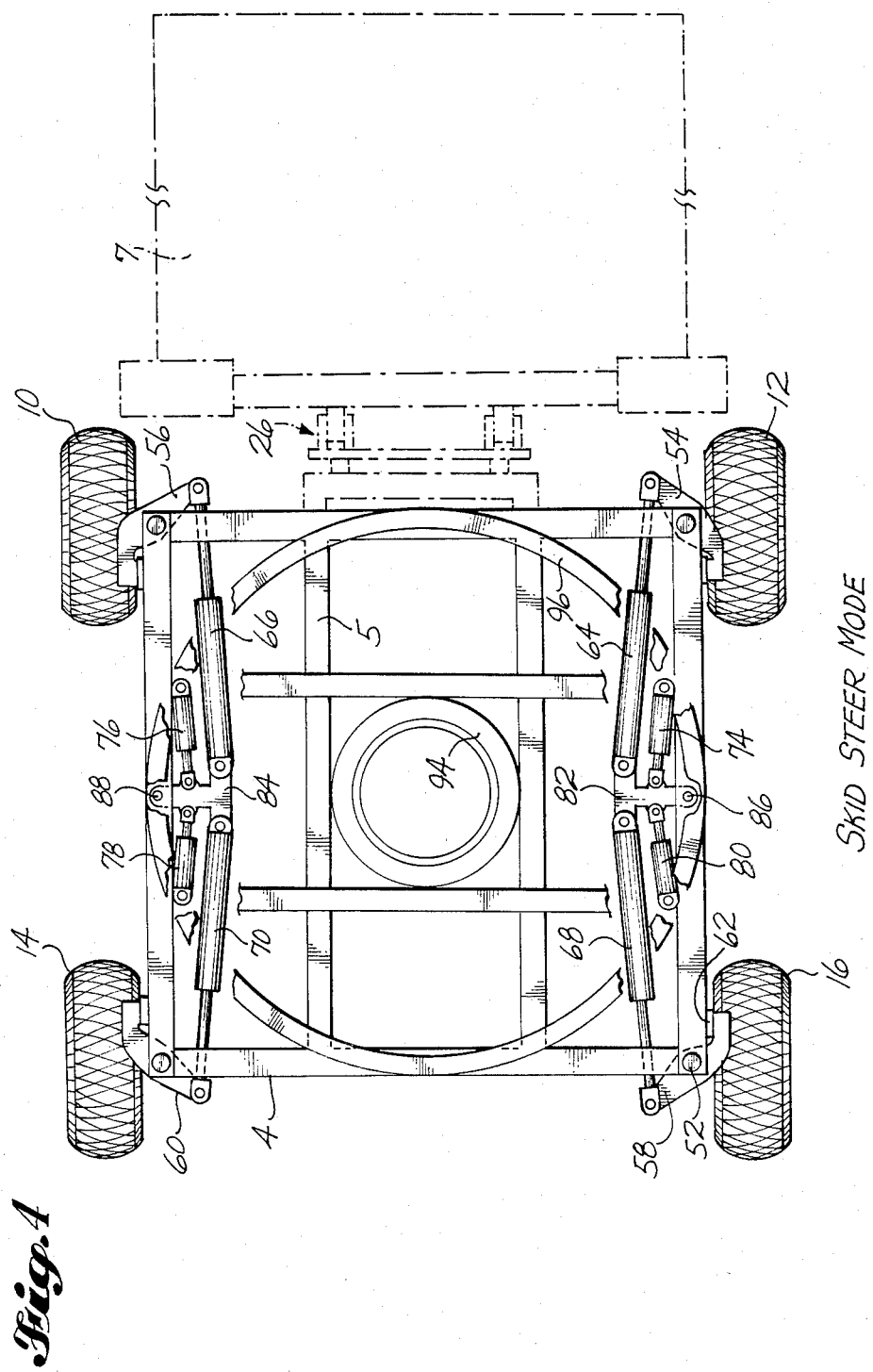

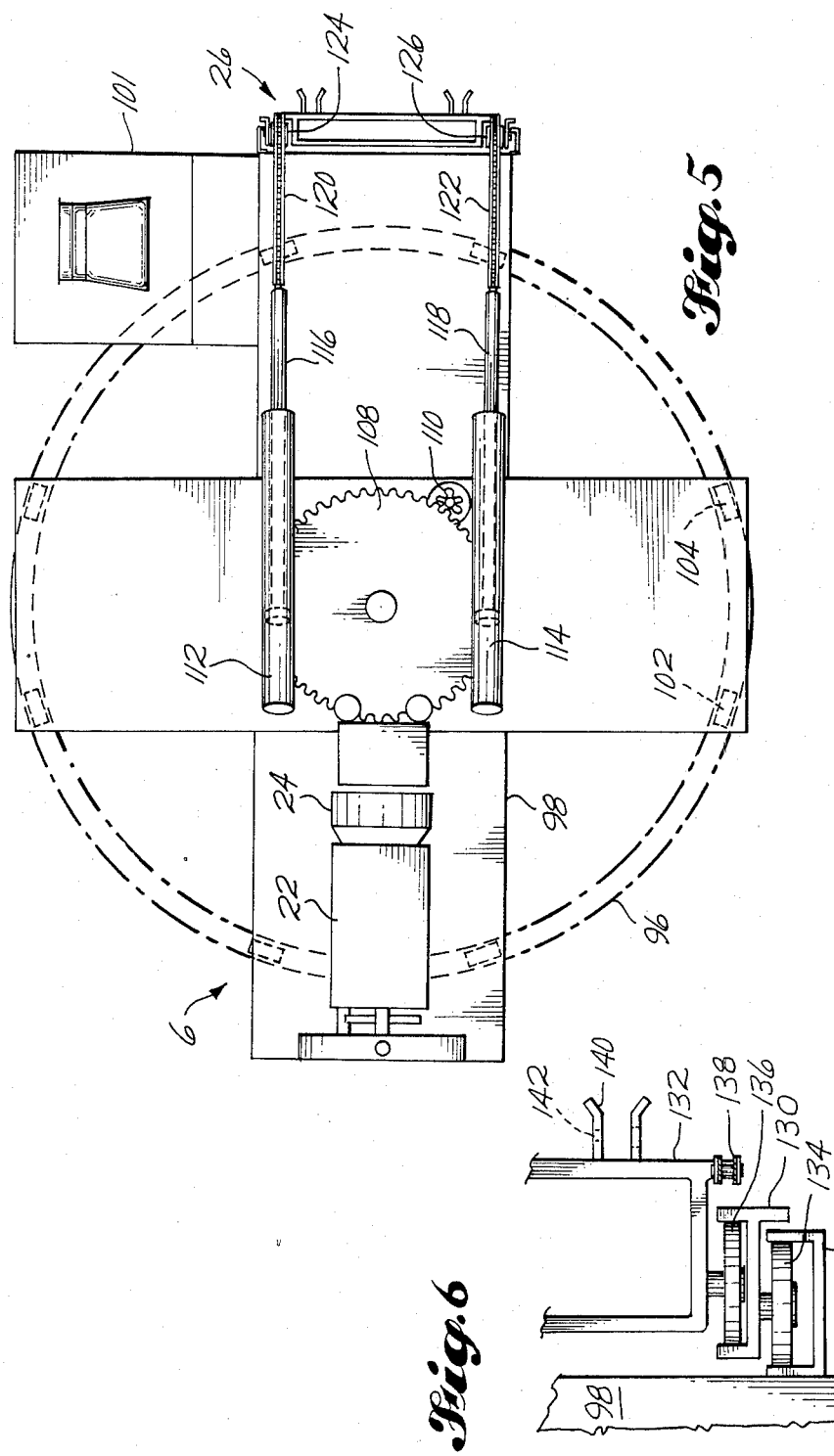

HIGHLY MANEUVERABLE PRIME MOVER

BACKGROUND OF THE INVENTION

This invention relates to highly maneuverable prime movers, particularly those adapted for lifting and transporting objects and ordered arrays of objects in locations where aisle space is limited.

Small-sized prime movers having excellent maneuverability are well known in the prior art. The common fork lift truck is one such example. These normally have rear wheel steering and, because of the very short wheelbase, can readily maneuver in tight spaces. The problem of maneuverability becomes more complex as the size of the equipment increases. The prior art is replete with examples of steering systems designed to improve the maneuverability of various types of vehicles. Two approaches have generally been followed. One has been to provide orthogonal steering capability for the vehicle. Some means is provided for turning all of the wheels 90° from the normal straight-line path. This gives the vehicle the capability of making a zero radius 90° turn. Early examples are seen in the patents to Adams, 1,901,276 and Budd, U.S. No. 1,577,559. In both of these examples the wheels were driven by a conventional mechanical linkage and a large part of the inventor's effort was dedicated to devising a suitable drive means. Other approaches can be typified by those found in the following United States Pat. Nos.: Pellizzetti, 2,863,518; Houlton, 3,197,229; Wilson, 3,825,087; Norris, 3,972,379; and Larson, Can. 1,010,373. Each of these vehicles is adapted to have orthogonal steering capability. The wheels are driven with individual hydraulic motors, a practice which greatly simplifies construction over the two examples cited earlier. The patent to Larson contains on excellent review of various types of steering systems.

Another approach to improving maneuverability has been to provide four-wheel steering. Normally, in vehicles so equipped, the front wheels or rear wheels may be steered independently. In addition, they may be steered simultaneously to provide one or both of two steering modes. Where, for example, the front wheels are turned to the right, the rear wheels may be appropriately turned to the left. This procedure significantly reduces the turning radius of the vehicle. In the other mode, both the front wheels and the rear wheels are turned in the same direction. This enables oblique or crab-wise travel. Examples of prime movers having this type of steering can be seen in U.S. patents to Conrad, U.S. Pat. No. 3,724,585, and Queen, U.S. Pat. No. 3,856,102. In addition, some of the earlier noted vehicles having orthogonal capability have also been designed to have four-wheel steering.

None of the prior art devices havng orthogonal steering capability have had Ackermann steering systems. In order to avoid wheel scuffing or dragging when turning a corner, the projections of the front wheel axles must meet at a common point on a vertical plane projected through the rear wheel axle. This requires the inside wheel in a turn to be at a sharper angle than the outside wheel. The differential between the wheels varies as the vehicle enters and withdraws from a turn. Linkages which achieve this requirement are termed "Ackermann steering systems". Ackermann systems are in almost universal use on all highway adapted vehicles.

The fact that the earlier vehicles having orthogonal capability do not have Ackermann steering systems poses a major disadvantage. For one thing, tire wear is greatly increased. A second problem is that such vehicles are unpleasant to operate. As they turn, the inside wheel in particular tends to bounce or vibrate as its scuffs across the ground surface. It can only be surmised that the complexities required for shifting from a normal to an orthogonal steering mode precluded provision of an Ackermann steering system in prior art highly maneuverable prime movers.

It might also be noted that the prior art shows prime movers having relatively versatile steering systems which also have rotatable operator cabs and load handling adaptation. One such system is shown in the aforementioned patent to Queen, U.S. Pat. No. 3,856,102. Another vehicle adapted for logging is shown in U.S. Pat. No. 3,981,336 to Levesque where the prime mover travels on four tracks and has a rotatable turret containing a boom equipped with a log-processing unit. In the case of the Levesque device the prime mover is skid-steered; i.e., the tracks on one side are braked while those on the other side are driven normally. The vehicle is thus caused to turn toward the side on which the drive elements are braked.

To the present inventors' knowledge there has been no prime mover heretofore available which combined a true Ackermann steering system with orthogonal steering capability.

SUMMARY OF THE INVENTION

The present invention concerns a prime mover having extremely high maneuverability even in versions having very long wheel bases. This prime mover is especially well adapted for lifting and transporting objects. For example, it can be used in general freight handling or to move large ordered arrays of smaller individual objects such as plant containers in a nursery operation. The prime mover comprises a main frame on which may be mounted a turret means which will normally have full 360° rotation. The device possesses means to supply motive and control power to the prime mover and turret, if the latter is present. Typically this is a gasoline or diesel engine or their equivalent such as a battery powered motor. The prime mover will be provided with means for mounting an operating tool head. Exemplary of such a tool heat might be an elevator means possessing some device for lifting the objects to be handled. These are preferably mounted on the turret if the prime mover is so equipped. Typical object handling means could be conventional forks, grippers, or a series of parallel chains or screws such as those disclosed in application Ser. No. 284,907, filed July 20, 1981. This application is commonly owned by the present assignee and is hereby incorporated by reference. The prime mover is supported on four drive wheels which are mounted in a spaced rectangular relationship on the frame. Means are present to shift the wheels through a 90° horizontal arc between a first position, where the wheels are adapted for Ackermann steering, to a second position, where the wheels are adapted for hybrid or skid steering. The device is thus equipped with both normal and orthogonal steering capability and possesses all of the advantages of Ackermann steering and hybrid or skid steering. Each wheel of the prime mover is preferably driven by an individual hydraulic motor.

Hybrid steering has some features of both Ackermann and skid steering. It is defined here to mean that only one wheel of a side-by-side pair is moved in a turn. This steered wheel can be either a front or rear wheel. While the unsteered wheel of the pair will drag or scuff somewhat in a turn, this will normally be of less consequence than the drag encountered in a turn when in a true skid steering mode and both wheels on one side drag or scuff. The improvement with hybrid steering is particularly noticeable when the wheelbase is long.

The unique steering capability of the device is achieved by adaptation of the wheels to be shifted in pairs from the first or Ackermann to the second hybrid or skid steer position. The shifting means for each pair comprises a T-bar in which the base of the stem portion of the T is pivotally attached to the approximate midpoint of a longitudinal frame member. Also provided are steering arm means for each wheel of the wheel pair. These steering arm means are pivotally attached to the frame through rigid attachments at the centers of rotation of the wheel kingpins. Each arm means has a first end which carries support means for one of the driving wheels. The second end of the steering arm means is operatively connected to a mode shifting means. This means ties the second end of the steering arm to the adjacent end of the crossbar of the T-bar. The mode shifting means is most conveniently a hydraulic cylinder, but it can be any mechanical equivalent which can be extended or retracted in order to partially relate the steering arm means about their respective pivot points. The extension or retraction of the mode shifting means causes the wheels of the pair to be turned toward or away from each other to effect a 90° change in wheel orientation. In the first position, the wheels of each pair are adapted for true Ackermann steering by means of a pair of hydraulic cylinders which operate in opposition between the frame and a point on the stem of the T-bar. Differential action of the hydraulic cylinders against the T-bar causes it to swing about its pivot point and to transmit steering motion to the wheels through the mode shifting means and the steering arms.

Either or both wheel pairs may be adapted for Ackermann steering when the wheels are in the first position. Where it is desired that only one wheel pair should have Ackermann steering capability, the other wheel pair may have the steering cylinders replaced with rigid struts. Where both wheel pairs have Ackermann steering capability, they may be turned in opposing directions, in order to affect a very short turning radius, or they may be turned in the same direction in order to achieve oblique or crabwise travel.

It is desirable that the frame of the prime mover be so constructed as to have load straddling capability when it is driven in at least one of the wheel positions.

It is an object of the present invention to provide a prime mover having extremely high maneuverability even when constructed in large sizes.

It is another object of the present invention to provide a prime mover having both normal and orthogonal steering capabilities.

It is a further object to provide a prime mover having full Ackermann steering capability when the wheels are in the normal steering position and hybrid or skid steering capability when the wheels are in the orthogonal steering position.

It is still a further object to provide a prime mover having extremely versatile steering capability which further contains a turret mounted tool head in order to gain additional load handling verstility.

It is yet another object to provide a prime mover having extremely high maneuverability which is capable of operating in narrow wheel aisles.

It is still another object to provide an extremely maneuverable prime mover with capability of handling large quantities of individual containers in each load.

These and many other ojects will become readily apparent on reading the following detailed description in conjunction with the appended drawings.

BRIEF DESCRIPTION OF THE DRAWINGS

FIG. 3 is a top plan view showing the steering and shifting mechanisms with the wheels in the Ackermann steering mode. Portions of the main frame are omitted and the turret frame and tool head are shown in ghost view.

FIG. 4 is a similar view of FIG. 3 showing the wheels in the hybrid or skid steering mode. The main frame is partially cut away and the right end of the turret and tool head are shown in ghost view.

FIG. 5 is a simplified top plan view of the turret means.

FIG. 6 is a fragmentary top plan view of one possible configuration of a load head elevator.

DESCRIPTION OF THE PREFERRED EMBODIMENTS

The following description represents the best mode or modes known to the inventors of carrying out the present invention. It will be understood by those skilled in the art that there may be many mechanical equivalents to the structures to be described and these are considered to be included within the scope of the invention.

Figure 1:
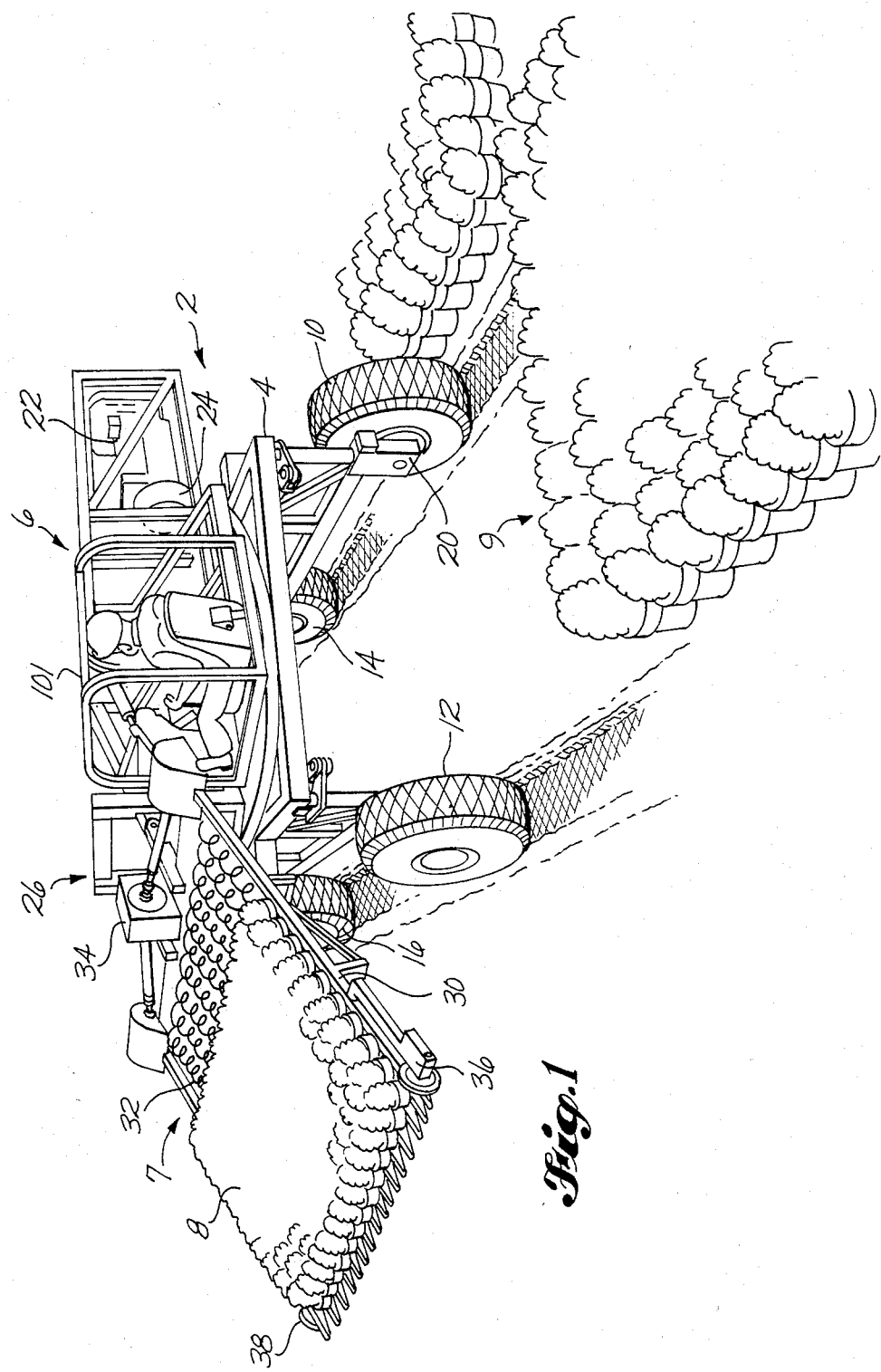
FIG. 1 is a perspective view of the prime mover when equipped with a tool head designed for transporting ordered arrays of small containers such as those in which nursery plants are grown.

Reference should be made to FIG. 1 which shows a prime mover, generally indicated at 2, which is operating within a commercial nursery transporting arrays of potted plants from one location to another. The prime mover consists of a frame 4 having interior bracing 5 (FIG. 4). The prime mover contains a turret mechanism, generally indicated at 6. This is equipped at one end with a working tool, generally indicated at 7, which in the present case is a device designed for lifting and transporting an array of potted plants 8. These plants were arranged in a nursery bed 9 where they are allowed to grow to a given size before they are transported to another location for shipment or repotting. The prime mover contains four drive wheels 10, 12, 14, and 16. Each wheel has an individual hydraulic drive motor 20. The entire device is powered by a gasoline or diesel engine 22 which in turn drives a main hydraulic pump 24. The working tool is carried on an elevator 26. In the present case it consists of a frame 30 containing an array of side by side conveyor screws 32. These are driven by a hydraulic drive motor and gear means 34. The head contains a speed sensor 36 and a height sensor 38. The speed sensor operates against the surface holding the plants and senses the forward or reverse speed of the prime mover with respect to the surface. This speed is converted to an electrical signal which is transmitted to a means, not shown, to control the speed of the screws relative to the speed of the prime mover. In this way, the plants can be picked up without the need for the operator to very carefully control the speed of the vehicle as he approaches or deposits his load. The advantages of this system are fully explained in application Ser. No. 284,907. The height sensor 38 can be used to control the height of the leading edge of the lifter frame so that it is at the height to properly accept the objects which comprise the payload.

Figure 2:
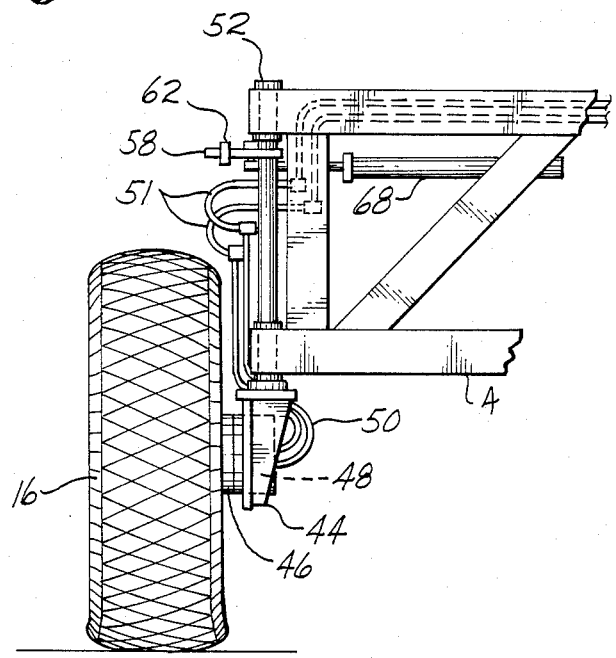
FIG. 2 is a fragmentary side elevation, showing the means by which individual wheels are mounted on the frame.

Reference is now made particularly to FIGS. 2, 3, and 4 which illustrate in detail the construction of the steering system. Each wheel, of which wheel 16 is exemplary, is supported on a gusseted box frame 44 and an axle 46. The axle is an extension of the drive shaft of the hydraulic motor 48. Rigid hydraulic lines 50 are connected through flexible lines 51 to the appropriate control valving. The flexible lines are necessary in order to accommodate normal turns during steering and particularly the 90° mode change of each wheel. The gusseted box frame 44 is supported on a shaft or kingpin 52 which serves as the center of rotation of the mode changing arc. Similar construction is found at each of the other wheel locations. Shaft 52 contains a steering arm means 58, in this case, in a form of a bell crank. Similar steering arm means 54, 56 and 60 are found at the other wheels. The steering arm means 58 contains a stop pad 62 which will bear against the frame when the wheels are in the second position or skid steering mode. A series of four hydraulic cylinders 64, 66, 68 and 70 serves to shift steering mode from Ackermann to skid steering. A second series of four shorter cylinders 74, 76, 78, and 80 serves to provide steering when in the Ackermann mode. Any of cylinders 64, 66, 68, and 70 to can also serve as a steering cylinder when using hybrid steering in the orthogonal mode.

Shifting from the first or Ackermann position to the second hybrid or skid steer position, is accomplished as follows. A pair of T-bars 82, 84 are pivotally attached to the approximate midpoints of opposed longitudinal frame members. These T-bars pivot about points 86, 88. Referring particularly to the lower portion of FIG. 3, cylinder 68 operates between steering arm 58 and one end of the cross portion of T-bar 82. Opposing cylinder 64 operates from one end of steering arm 54 and the other side of the cross portion of T-bar 82. Steering cylinders 74 and 80 act between the frame and a position on the main stem of the T-bar. When cylinders 74 and 80 act differentially against T-bar 82 it is caused to swing about its pivot point 86. This transmits true Ackermann steering motion to the wheels through the mode changing cylinders 64, 68 acting against the steering arms 54, 58. While steering motions are being transmitted cylinders 64, 68 act as rigid links in the system.

The system is changed from the first or Ackermann mode to the second or skid steer mode by energizing mode change cylinders 64, 68 and 66, 70 so that their piston rods are extended (FIG. 4). This causes the respective steering arms to be rotated about their pivot points. Referring to the lower portion of FIG. 4, steering arm 58 has been rotated about axis 52; the other steering arms were similarly rotated through a 90° horizontal arc. When in the skid steer mode the wheels remain in a fixed position. Still referring to FIG. 4, if the direction of travel is from left to right, wheels 10 and 14 would be braked if it were desired to make a left turn and wheels 12 and 16 would be braked if it was desirable to turn to the right.

The prime mover will have its best maneuverability when in the first or Ackermann steering mode. Accordingly, the second hybrid or skid steer modes will be chosen when travel is more nearly of a straight line type and sharp turns are not required. Assume that the prime mover of FIG. 4 is travelling from left to right and the operator wished to make a turn to the right. Either wheel 10 or 14 could be turned to accomplish the action when in the hybrid mode. This is most conveniently done by shortening either cylinder 66 or 70 to achieve a limited rotation of wheel 10 or 14. Normally, about 15° of rotation about the kingpin is permissible. An alternative to the use of the mode change cylinders for hybrid steering would be the use of short jack cylinders (not shown) operating between the frame and steering arms. A further alternative might be the use of electrically or hydraulically operated cams located between the frame and stop pads 62.

In other frame configurations where steering movement in the orthgonal position was not limited to one direction, a single wheel or pair of wheels; e.g., wheels 10 or 14, could suffice for hybrid steering. In the configuration shown in FIG. 4, wheels 10 or 14 are used for a right turn and wheel 12 or 16 for a left turn.

Hybrid steering gives the advantage of tighter turns than skid steering when in the orthogonal mode. It has the disadvantage of requiring a somewhat more complex control system.

Turret frame 98, is shown in ghost form superimposed on the main frame of the prime mover (FIG. 3). In general, the turret frame 98 is of cruciform construction having very similar geometry to the internal bracing 5 of main frame 4 (as shown in FIG. 3). The turret bears on a fixed ring 96 attached to the main frame. Turret construction is generally shown in the simplified top plan view of FIG. 5. An operator's cubicle 101 is cantilevered from one end of the cruciform frame 98. The main frame ring 96 (FIG. 4) supports the turret on a series of rollers 102, 104, of which only two are numbered on the drawing, which in turn are mounted to the turret frame on an equivalent arc 100. A large gear 108 is fixed to the main frame and mounted on supporting member 94 (FIG. 5). This is engaged by a small pinion gear 110 suspended from a hydraulic motor, not shown, which is mounted on the turret. When the hydraulic motor which drives gear 110 is energized the pinion serves to turn the turret to the desired position on the main frame. In the particular embodiment shown, the turret carries a tool head which is mounted on an elevator 26. This elevator is controlled through two fluid acting cylinders 112, 114 containing pistons with piston rods 116, 118. Chains 120, 122 are extended from the ends of the piston rods over rollers 124 and 126. These in turn are attached at locations 138 to the inner member 132 of a series of telescoping channels which comprise the elevator. This is best seen in FIG. 6. Here the elevator comprises an outer channel 128, a middle channel 130 and the inner member 132. The two interior members are equipped with rollers 134,136 which serve to bear within the confines of the adjacent outwardly located channels. This construction is quite conventional and forms no part of the present invention. The inner elevator member 132 contains tool head mounting lugs 140 which are apertured at 142 so that the operating tool can be pinned or otherwise conveniently mounted to the elevator means. The elevator is raised or lowered by the action of the hydraulic cylinders 112, 114.

Figure 7:
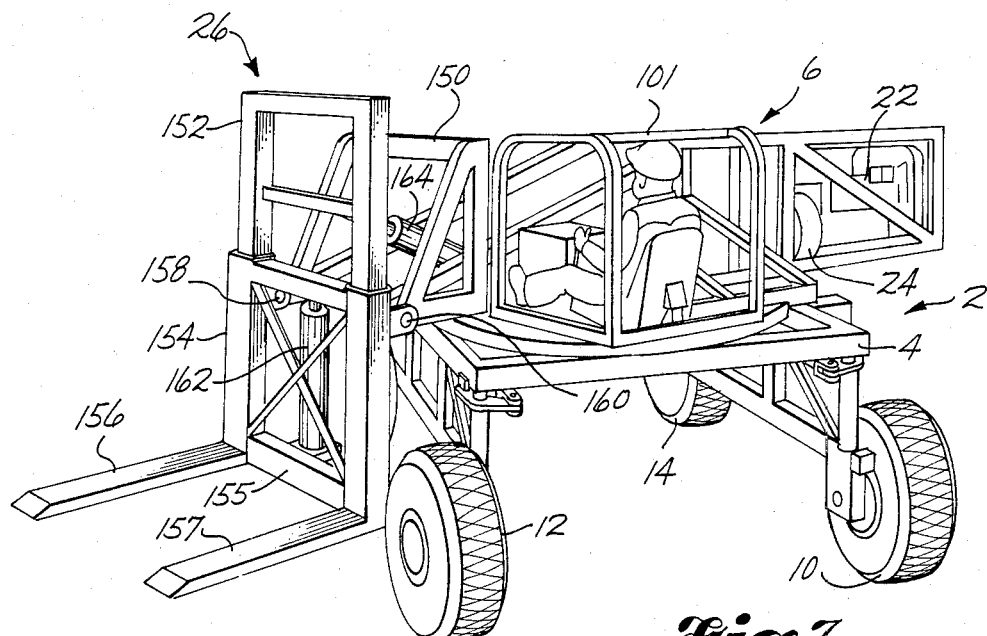
FIG. 7 is a perspective view of the entire apparatus showing the prime mover equipped with a fork lift tool head.

The invention is not limited to the use of a tool head such as the one just described. For example, FIG. 7 shows the use of a tool head similar to that found on a conventional fork lift. The tool head is mounted on a subframe 150 which in turn is rigidly fixed to the frame of the turret. On the outboard end, the subframe bears a pair of vertical elevator rails 152 which cooperate within a lower channel or telescoping frame 154. The frame members 154 are unitized by crosspieces 155 to provide a rigid member. At the lower extremity this frame bears forks or fingers 156,157 which will engage a pallet or otherwise support the load to be transported. The entire load-bearing mechanism can be pivoted at 158 and 160 by the action of tilting cylinder 164 in order to provide better stability to the load during transportation. The load is lifted and lowered conventionally by an elevating cylinder 162.

Figure 8:
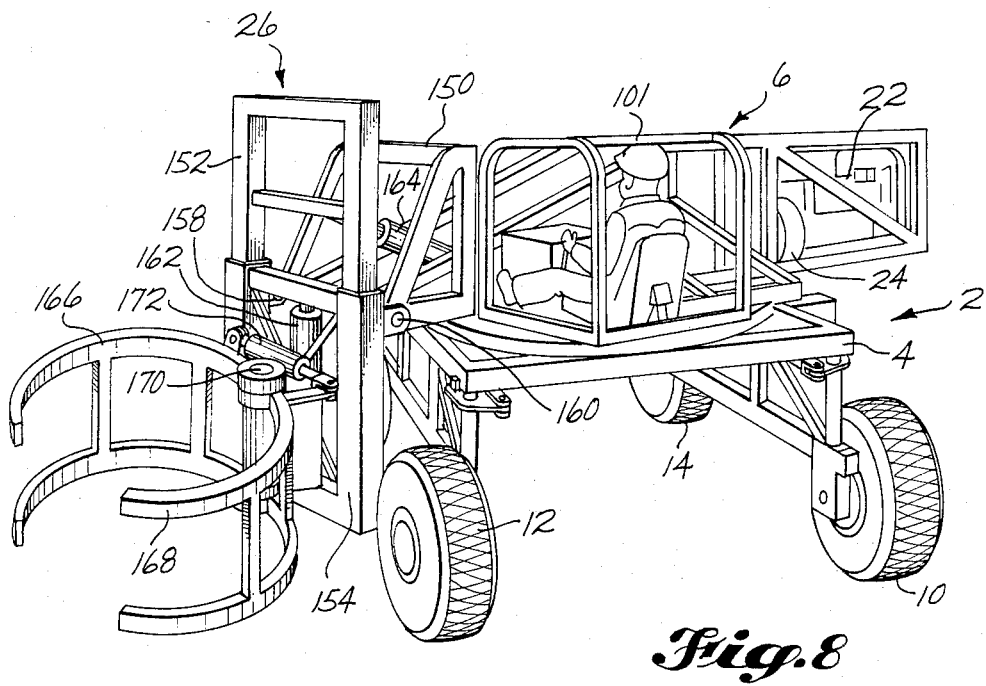
FIG. 8 is a perspective view similar to FIG. 7 in which the food head is adapted for handling drums.

The tool head version shown in FIG. 8 is similar to that of FIG. 7 except that the fork lift mechanism has been replaced by a drum gripping means. This consists of a pair of arcuate drum grasping arms 166, 168 which operate about a pivot or axle 170 and are actuated to engage or release a drum through the action of hydraulic cylinder 172.

Other tool heads may be used. Various tool heads may be readily interchanged by a quick coupling means similar to the one shown in FIG. 6.

EXAMPLE

A prime mover of the type described was constructed specifically for handling potted plants in a commercial nursery. The tool head was made, as shown in FIG. 1 and as described in detail in application Ser. No. 284,907, to handle up to 16 columns of plants ordered in a rectangular or diagonal grid arrangement. Maximum capacity of the head was 176 so-called No. 1 (approximately one gallon) plant containers.

Many large nurserys are laid out with 2.44 m (8 ft) wide growing beds with 0.61 m (2 ft) aisles between them. Turning space from the aisles into transverse roads is very limited in order to effect maximum utilization of the extremely valuable land.

The prime mover dimensions were selected so as to be optimum for this space-limited environment. The frame was square with centers of 2.67 m (8.76 ft) between kingpins and 3.05 m (10 ft) between wheel centerlines. Wheels had large flotation-type tires 1.01 m in diameter and 0.38 m in maximum width in inflated but unloaded conditions. The main turret gear mounted on the frame was about 0.76 m in diameter and the pinion gear operating against this to turn the turret was about 0.13 m in diameter.

Power was supplied by a 3 cylinder 2.6 L diesel engine driving hydraulic pumps supplying 190 L/min of hydraulic fluid at 20,700 kPa pressure maximum.

The hybrid or skid steering modes were chosen while operating in the narrow aisles between beds. Travel here is primarily straight line with only minor course modifications being necessary. In this mode the prime mover stradled the growing beds and had a clearance of 1.2 m. When the apparatus moved into one of the transverse roads or main roads, the steering was shifted into a two-wheel Ackermann made. Wheel position could be changed between modes in less than 10 seconds. Front wheel or rear wheel steering worked equally well and the vehicle operators used both interchangeably.

The prime mover is able to achieve very high productivity in moving the potted plants to a repotting or shipping zone. Prior to its use, hand labor had been employed in lifting the plants onto a truck or carrier bed and then removing them at the receiving zone.

It will be apparent to those skilled in the art that many modifications can be made in the apparatus described without departing from the spirit of the invention. The scope of the invention is thus to be limited only as defined in the appended claims.

What is claimed is:

1. A highly maneuverable prime mover which comprises:
   a. a main frame;
   b. rotatable turret means mounted on the frame;
   c. means to supply motive and control power to the prime mover wheels and turret;
   d. means for mounting an operating tool head on the turret means;
   e. four supporting drive wheels mounted in a spaced rectangular relationship on the frame;
   f. steering arm means operatively connected to each wheel;
   g. mode shifting means acting on the steering arm means, said shifting means adapted to shift each wheel through a 90° horizontal arc between a first position and a second position orthogonal to the first; and
   f. steering means operating on the steering arms to control direction of travel by Ackermann steering at least one side-by-side wheel pair when the wheels are in the first position, the mode shifting means serving as a linkage between the steering means and steering arm means, said prime mover being adapted for skid steering or hybrid steering when the wheels are in the second position, wherein said hybrid steering involves steering only a single wheel of one pair.

2. The prime mover of claim 1 in which the turret means is adapted for 360° rotation.

3. The prime mover of claim 1 in which the motive and control power means is an engine.

4. The prime mover of claim 1 in which the motive and control power means is a battery powered motor.

5. The prime mover of claims 3 or 4 in which the motive and control power means is mounted on the turret.

6. The prime mover of claim 1 in which the wheels are driven by individual hydraulic motors.

7. The prime mover of claim 1 in which the tool head comprises object lifting means.

8. The prime mover of claim 7 in which the object lifting means includes an elevator means.

9. The prime mover of claim 8 in which the lifting means includes horizontally disposed fingers for engaging a load.

10. The prime mover of claim 8 in which the lifting means includes a gripping mechanism.

11. The prime mover of claim 8 in which the lifting means includes a plurality of side-by-side screw conveyors adapted for lifting a geometrically patterned array of objects.

12. The prime mover of claim 8 in which the lifting means includes a plurality of side-by-side chain-type conveyors for liftings geometrically patterned array of objects.

13. The prime mover of claim 1 in which the wheels are adapted to be shifted in pairs from the first position to the second position orthogonal to the first, said shifting means for each wheel pair comprising:
   a. a T-bar having the base of the stem portion of the T pivotally attached to the midpoint of a longitudinal frame member;
   b. the steering arm means for each wheel of the pair comprising a vertically oriented shaft rotationally mounted in the frame at the center of rotation of the wheel shifting arc, each shaft having a first end with support means for a drive wheel and a second end bearing a lever arm oriented normal to the axis of the shaft, the lever arm being operatively connected to
   c. individual mode shifting means which tie the lever arm of each steering arm means to the adjacent end of the crossbar of the T, said shifting means adapted to be simultaneously extended or retracted in order to partially rotate the steering arm means about their respective axes of rotation and cause the wheels of the pair to be turned toward or away from each other in order to effect a 90° change in each wheel orientation as the wheels shift between the first and second positions.

14. The prime mover of claim 13 in which the shifting means are hydraulic cylinders.

15. The prime mover of claims 13 further containing a pair of hydraulic steering cylinders adapted for Ackermann steering when the wheels are in the first position, said steering cylinders being placed in opposition between the frame and a position on the stem of the T-bar so that by differentially acting against the T-bar it is caused to swing about its pivot point and transmit steering motion to the wheels through the mode shifting means and steering arm means.

16. The prime mover of claim 15 in which only one of the wheel pairs are adapted to Ackermann steer when the wheels are in the first position.

17. The prime mover of claim 15 in which both wheel pairs are adapted to Ackermann steer when the wheels are in the first position.

18. The prime mover of claim 1 in which the frame is constructed to give the prime mover straddle capability in at least one wheel position.

19. A highly maneuverable prime mover which comprises:
   a. a main frame;
   b. four supporting drive wheels mounted in a spaced rectangular relationship on the frame;
   c. drive means for each wheel;
   d. steering arm means operatively connected to each wheel;
   e. mode shifting means acting on the steering arm means, said shifting means adapted to shift each wheel through a 90° horizontal arc between a first position and a second position orthogonal to the first; and
   f. steering means operating on the steering arms to control direction of travel by Ackermann steering at least one side-by-side wheel pair when the wheels are in the first position, the mode shifting means serving as a linkage between the steering means and steering arm means, said prime mover being adapted for skid steering or hybrid steering when the wheels are in the second position, wherein said hybrid steering involves steering only a single wheel of one pair.

20. The prime mover of claim 19 in which the motive and control power means is an engine.

21. The prime mover of claim 19 in which the motive and control power means is a battery powered motor.

22. The prime mover of claim 19 in which the wheels are driven by individual hydraulic motors.

23. The prime mover of claim 21 in which the tool head comprises object lifting means.

24. The prime mover of claim 19 further having means for mounting an operating tool head on the prime mover.

25. The prime mover of claim 23 in which the object lifting means includes on elevator means.

26. The prime mover of claim 25 in which the lifting means includes horizontally disposed fingers for engaging a load.

27. The prime mover of claim 25 in which the lifting means includes a gripping mechanism.

28. The prime mover of claim 25 in which the lifting means includes a plurality of side-by-side screw conveyors adapted for lifting a geometrically patterned array of objects.

29. The prime mover of claim 25 in which the lifting means includes a plurality of side-by-side chain-type conveyors for liftings geometrically patterned array of objects.

30. The prime mover of claim 1 in which the wheels are adapted to be shifted in pairs from the first position to the second position orthogonal to the first, said shifting means for each wheel pair comprising:
   a. a T-bar having the base of the stem portion of the T pivotally attached to the midpoint of a longitudinal frame member;
   b. the steering arm means for each wheel of the pair comprising a vertically oriented shaft rotationally mounted in the frame at the center of rotation of the wheel shifting arc, each shaft having a first end with support means for a drive wheel and a second end bearing a lever arm oriented normal to the axis of the shaft, the lever arm being operatively connected to
   c. individual mode shifting means which tie the lever arm of each steering arm means to the adjacent end of the crossbar of the T, said shifting means adapted to be simultaneously extended or retracted in order to partially rotate the steering arm means about their respective axes of rotation and cause the wheels of the pair to be turned toward or away from each other in order to effect a 90° change in each wheel orientation as the wheels shift between the first and second positions.

31. The prime mover of claim 30 in which the shifting means are hydraulic cylinders.

32. The prime mover of claims 30 or 31 further containing a pair of hydraulic steering cylinders adapted for Ackermann steering when the wheels are in the first position, said steering cylinders being placed in opposition between the frame and a position on the stem of the T-bar so that by differentially acting against the T-bar if is caused to swing about its pivot point and transmit steering motion to the wheels through the mode shifting means and steering arm means.

33. The prime mover of claim 32 in which only one of the wheel pairs are adapted to Ackermann steer when the wheels are in the first position.

34. The prime mover of claim 32 in which both wheel pairs are adapted to Ackermann steel when the wheels are in the first position.

35. The prime mover of claim 19 in which the frame is constructed to give the prime mover straddle capability in at least one wheel position.

* * * * *

UNITED STATES PATENT AND TRADEMARK OFFICE
CERTIFICATE OF CORRECTION

PATENT NO.  : 4,498,554
DATED       : Feb. 12, 1985
INVENTOR(S) : Roy E. Young, Douglas K. Stricklin, and Henry M. W. Givens It is certified that error appears in the above—identified patent and that said Letters Patent is hereby corrected as shown below:

Column 1, line 55, "havng" should read --having--.

Column 3, line 28, "relate" should read --rotate--.

Column 4, line 24, "of Fig. 3" should read --to Fig. 3--.

Claim 15 at column 9 line 27, "claims 13" should read --claims 13 or 14--.

Claim 30 at column 10, line 24, "claim 1" should read --claim 19--.

Signed and Sealed this

Sixteenth Day of July 1985

[SEAL]

Attest:

DONALD J. QUIGG

Attesting Officer

Acting Commissioner of Patents and Trademarks